US005811671A

United States Patent [19]

Seekircher et al.

[11] Patent Number: 5,811,671

[45] Date of Patent: Sep. 22, 1998

[54] METHOD AND APPARATUS FOR TESTING THE ELECTRICAL CONNECTION OF SOLENOID-COIL-OPERATED INJECTION VALVES

[75] Inventors: Juergen Seekircher, Ostfildern; Martin Bair, Stuttgart, both of Germany

[73] Assignee: Mercedes-Benz AG, Stuttgart, Germany

[21] Appl. No.: 759,104

[22] Filed: Dec. 2, 1996

[30] Foreign Application Priority Data

Dec. 1, 1995 [DE] Germany ........................ 195 44 845.6

[51] Int. Cl.[6] ............................ G01M 15/00; H04B 5/00; F02M 65/00

[52] U.S. Cl. ........................................................... 73/119 A

[58] Field of Search .................................... 73/116, 117.2, 73/117.3, 118.1, 119 A; 364/431.051, 431.052, 431.053; 701/103, 104, 105

[56] References Cited

U.S. PATENT DOCUMENTS

| | | | |
|---|---|---|---|
| 4,441,360 | 4/1984 | Dooley et al. | 73/119 A |
| 4,517,833 | 5/1985 | Wesley | 73/119 A |
| 4,541,271 | 9/1985 | Flaig et al. | 73/119 A |
| 4,687,994 | 8/1987 | Fulkerson et al. | 73/119 A |
| 5,018,388 | 5/1991 | Mosebach et al. | 73/119 A |
| 5,133,323 | 7/1992 | Treusch | 73/119 A |
| 5,241,858 | 9/1993 | Wieczorek et al. | 73/119 A |

FOREIGN PATENT DOCUMENTS

| | | |
|---|---|---|
| 272 682 | 10/1989 | Germany . |
| 61-129460 | 6/1986 | Japan . |
| 63-248969 | 10/1988 | Japan . |

*Primary Examiner*—George M. Dombroske
*Attorney, Agent, or Firm*—Evenson, McKeown, Edwards & Lenahan, P.L.L.C.

[57] ABSTRACT

A method and an apparatus for testing the electrical connection of electrically controlled, electromagnetically operated injection valves of an internal-combustion engine which are equipped with solenoid coils. The cabling of such injection valves is tested in a non-contact manner by positioning a respective magnetic field sensor close to a respective injection valve within a magnetic stray field vicinity of the injection valves. A voltage is applied to the electric connection intended for the respective injection valve, and it is determined whether a magnetic stray field in the vicinity of the corresponding injection valve resulting from this voltage is detected by the assigned magnetic field sensor. The method and apparatus can be used to test whether the injection valves are correctly connected with the connection individually intended for them. The method and apparatus may be used in a bench test for an internal combustion engine.

20 Claims, 2 Drawing Sheets

METHOD AND APPARATUS FOR TESTING THE ELECTRICAL CONNECTION OF SOLENOID-COIL-OPERATED INJECTION VALVES

BACKGROUND AND SUMMARY OF THE INVENTION

This invention relates to a method and an apparatus for testing the electrical connection of solenoid-coil-operated injection valves for a combustion engine. Such electrically controllable injection valves contain a solenoid coil which generates a magnetic field when acted upon by a current, which moves a pertaining valve adjusting element into its open position against a closing force applied, for example, by a spring. After being mounting on the engine block, the injection valves are electrically connected by way of a corresponding plug-type connection and a cabling system to an engine control unit.

In conventional bench tests, the injection valves of the internal-combustion engine together with their pertaining cabling are pneumatically tested by measuring a pressure drop during the operation of the valves or by measuring an electric resistance. However, neither of these known testing methods can determine whether the injection valves are connected with the correct connector plugs. An improper or reversed connection of injection valves presents problems because, although this does not result engine failure, it leads to a deterioration of the operation of the engine by affecting cold-starting behavior, warm-up characteristics, and running and fuel consumption. Although the individual cables may be coded to identify the proper cable for each respective injection valve, such coding of the cables is expensive. Therefore, methods have been suggested in various cases for non-contact testing of the function and connection of the injection valves.

In German Patent Document DD 272 682 A1, an automatic monitoring of the fuel injection operation in the case of diesel engines is disclosed in which a measuring system consisting of ultrasonic converters is provided, each of which being assigned to a respective cylinder of the engine and being fastened in a sound-conducting manner on the respective cylinder head. The ultrasonic converters detect the sound emitted by the fuel injection operation, specifically the sound emitted by the movement of the valve nozzle needle or by the injected fuel. By analyzing the detected sound signals, the proper operation of the fuel injection system is tested. The design of the measured section for recording the sound emission for each cylinder is the same for each cylinder. Specifically, the fuel injection operation of all cylinders is monitored by analyzing the sound signals as a function of the crank angle in a monitoring range which comprises the crank angle range from the crank angle interval of the reliably detected static delivery start of the fuel injection pump to the crank angle interval during which, in the case of a maximal cylinder filling, fuel can still be injected.

In a process described in Japanese Published Patent Application JP 63-248969 (A), the cutoff voltage induced by the solenoid coil of a respective solenoid-coil-operated injection valve is detected during the cutoff of the current by the solenoid coil and is compared with a reference value. When the induced cutoff voltage does not exceed the reference value, an information signal is generated which indicates an improper condition of the injection valve.

From Japanese Published Patent Application JP 61-129460 (A), it is known to recognize injection valves which are matched in a faulty manner by means of a detection circuit set up specifically for this purpose, for which this circuit is connected with the injection valves by way of separate respective electric lines. As soon as the injection valve with the faulty matching is recognized, a pertaining warning light will light up.

There is a need for a method and an apparatus which can test the electrical connection of solenoid-coil-operated injection valves for an internal-combustion engine in a non-contact manner and with comparatively low expenditures to determine whether each of the injection valves is electrically connected to a control connection, and if so, if each of the injections valves is connected with the proper respective control connection.

This and other needs are met by the present invention by providing a method for testing the electrical connection of a plurality of solenoid-coil-operated injection valves for an internal-combustion engine, each of the injection valves being assigned to a respective electric connection of a control connection unit, the method comprising the steps of: positioning at least one magnetic field sensor proximate respective of the injection valves; applying a voltage to at least one of the electric connections; and determining whether a magnetic field is detected by the at least one magnetic field sensor.

In accordance with a further aspect of the present invention, these and other needs are met by providing an apparatus for testing the electrical connection of a plurality of solenoid-coil-operated injection valves for an internal-combustion engine, each of the injection valves being assigned to a respective electric connection of a control connection unit, the apparatus comprising: at least one magnetic field sensor which are positioned proximate respective of the injection valves; and a control unit for applying a voltage to at least one of the electric connections and for analyzing output signals of the magnetic field sensors to determine whether a magnetic field is detected by the at least one magnetic field sensor.

In accordance with a further aspect of the present invention, these and other needs are met by determining whether a magnetic field detected by the magnetic field sensor is detected at the injection valve assigned to the electric connection to which the voltage is applied.

According to the present invention, testing of the electrical connection of the injection valves, including testing whether the injection valves are connected at all and if they are electrically connected correctly, i.e., are not reversed, takes place in a non-contact manner by detecting of the magnetic stray field which is generated by the energization of the solenoid coil during control of the respective injection valve. For this purpose, a magnetic field sensor is positioned in the proximity of each injection valve and detects the magnetic stray field generated by the solenoid coil of the respective injection valve when the solenoid coil is acted upon by current. Various constructions of magnetic field sensors are known and accordingly are not further described herein. After a voltage is applied to a respective electric connection for an injection valve, it can therefore be determined whether a current flow has actually taken place through the solenoid coil of the injection valve intended for this connection or whether, because of an improper or reversed connection of the valves, a current is flowing through the solenoid coil of another injection valve. In addition, electric line interruptions can be recognized if, after the application of a voltage to an electric connection, none of the solenoid coils of the injection valves generate a magnetic stray field. Furthermore, this method permits a detection of whether all injection valves are present or whether one or several valves are not mounted.

During a testing operation, the current supplied to a respective injection valve solenoid coil need only be so high that a detectible magnetic stray field is generated. In particular, it does not have to be so high that the injection valve opens but can be maintained so low that the valves remain closed. For injection valves which are filled with a preservative fluid, this has the advantage that the preservative fluid is maintained during the cabling test and the preservative fluid is not blown out into the engine as in the case of a pneumatic injection valve test. In contrast to the pneumatic injection valve test, the method according to the present invention also reduces setup and testing times because a pressurized air connection to the fuel distributing pipe on which the injection valves are mounted is no longer necessary, and the filling and settling times which are necessary in the pneumatic valve test are not required. The method and apparatus according to the present invention are particularly suitable for use within an engine bench test device.

In accordance with a further aspect of the present invention, several injection valves can be tested simultaneously with respect to their correct cabling because of the fact that alternating voltages of different frequencies are applied to the electric connections which result in correspondingly different magnetic stray fields in the solenoid coils of the injection valves. By means of the suitable analysis of the magnetic-field sensor signals, the correctness of the assignment of the electric connections to the solenoid coils and thus to the injection valves can therefore be determined within a brief test period.

Other objects, advantages and novel features of the present invention will become apparent from the following detailed description of the invention when considered in conjunction with the accompanying drawings.

DETAILED DESCRIPTION OF THE DRAWINGS

Figure 1:
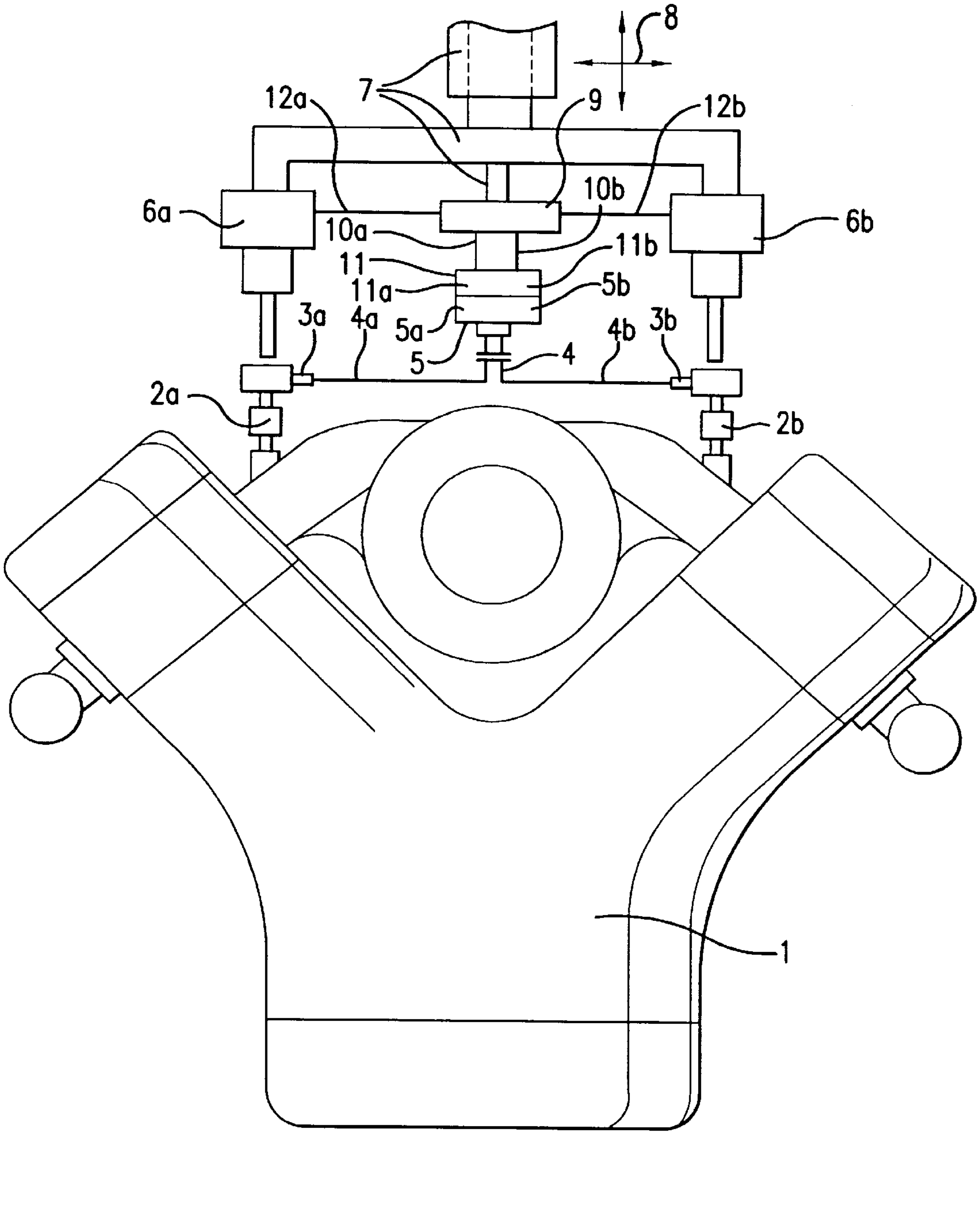
FIG. 1 is a schematic block diagram of an apparatus for testing the electrical connection of solenoid-coil-operated injection valves of an internal-combustion engine according to a preferred embodiment of the present invention.

FIG. 1 shows an apparatus for testing the injection valve cabling as a part of a cold test of an internal-combustion engine 1 carried out by means of an appropriately equipped test bench device, in which case, for reasons of clarity, only the components are shown which are relevant to the invention. The injection valves of the engine 1, which are to be tested during the cold test and of which two injection valves 2*a*, 2*b* are explicitly illustrated, are mounted on the engine block with a fuel distributor pipe not shown in detail. The injection valves are of a conventional, electrically controlled, electromagnetically operated construction, in the case of which the valve adjusting element is pressed into the closed position by means of a spring and a solenoid coil is provided whose magnetic field, when acted upon by current, moves the valve adjusting element into its open position. For the electric control of the injection valves 2*a*, 2*b*, a control line 4*a*, 4*b* is assigned to each solenoid coil and therefore to each of the solenoid-coil operated injection valves 2*a*, 2*b*. After the injection valves 2*a*, 2*b* are mounted on the engine 1, the control lines 4*a*, 4*b* are plugged in by plug-type connections 3*a*, 3*b* on the respective intended injection valve 2*a*, 2*b*. In this case, the control lines 4*a*, 4*b* are laced out of a cable harness strand 4 on this valve-side end section, which cable harness strand 4 combines these control lines 4*a*, 4*b* and additional lines for various other functions. The injection valve control lines 4*a*, 4*b* extend from the injection valves 2*a*, 2*b* through the cable harness strand 4 to a control connection unit 5 which contains an electric connection 5*a*, 5*b* for each connection line 4*a*, 4*b*.

In the normal engine operation, an engine control unit, which is part of the engine 1 and is not shown, is connected with the control connection unit 5 and generates the control signals for actuating the injection valves 2*a*, 2*b* and feeds the signals to the pertaining control lines 4*a*, 4*b*. In the illustrated engine cold test, this control connection unit 5 forms the electric tapping site for testing the cabling of the injection valves 2*a*, 2*b*; that is, the correct electric conductibility of the control connection unit 5 and the injection valve control lines 4*a*, 4*b* as well as the proper assignment of the control lines 4*a*, 4*b* to the individual injection valves 2*a*, 2*b* by way of the plug-type connections 3*a*, 3*b*. For this purpose, the test bench device has a linkage 7 which is arranged in a three-dimensionally movable manner on a stationary frame, as indicated by the arrow cross 8. On the linkage, a number of magnetic field sensors 6*a*, 6*b* are mounted which correspond to the number of injection valves 2*a*, 2*b*, the magnetic field sensors 6*a*, 6*b* being arranged corresponding to the position of the injection valves 2*a*, 2*b* on the engine 1. The magnetic field sensors 6*a*, 6*b* may be any of the variously known constructions and output a signal when a magnetic stray field is sensed.

By appropriately positioning the linkage 7, all magnetic field sensors are simultaneously brought into the direct vicinity of a respective assigned injection valve, as illustrated in FIG. 1. Typical approach distances amount, for example, to between 6 cm and 10 cm, but may vary depending upon the type and size of injection valves, the available space, the voltage applied, and the sensitivity of the magnetic field sensors. The magnetic field sensors 6*a*, 6*b* are therefore situated within the respective magnetic stray field vicinity of the injections valves 2*a*, 2*b*; that is, within the space range in which the solenoid coils of the injection valves 2*a*, 2*b* generate magnetic stray fields which can be measured by the magnetic field sensors 6*a*, 6*b* at coil currents which are lower than the solenoid coil current required for opening the valve 2*a*, 2*b*. This permits the injection valve cabling to be tested without needing to open the injections valves 2*a*, 2*b*.

The cabling testing operation is controlled and analyzed by a testing control unit 9. For this purpose, the control unit 9 generates valve-controlling alternating-voltage signals of different frequencies, of which each is fed to a separate, valve-specific output control line 10*a*, 10*b* which is led to a testing connection unit 11 with separate testing connections 11*a*, 11*b* corresponding to and engageable with the respective electric connections 5*a*, 5*b* for each connection line 4*a*, 4*b*. During the injection valve testing operation, this testing connection unit 11 is connected with the input-side of the control connection unit 5 of the injection valve control lines 4*a*, 4*b*, in place of an engine-control connection unit which later is connected to control the operation of the injection valves during the normal operational use of the engine. In this manner, the testing control unit 9 can apply to the individual electric connections 5*a*, 5*b* of the control connection unit 5 of the injection valve control lines 4a, 4b one alternating voltage respectively of a characteristics frequency which, in the case of a correct cabling, causes a corresponding admission of current to the solenoid coil of the respective intended injection valve 2a, 2b and therefore a specific magnetic stray field in the vicinity of therespective intended injection valve 2a, 2b. The generated magnetic stray fields are sensed individually for each injection valve 2a, 2b by the respective assigned magnetic field sensor 6a, 6b.

By way of corresponding signal lines 12a, 12b, the output signal of each magnetic-field sensor 6a, 6b is fed to the analyzing testing control unit 9. By means of a comparison of the obtained stray field information with the alternating voltage signal which was intended for the corresponding injection valve 2a, 2b, the testing control unit 9 determines for each injection valve 2a, 2b whether its cabling, that is, the electric line path from the respective electric connection 5a, 5b by way of the cable harness 4 and the laced end section of the control lines 4a, 4b to the solenoid coil of the injection valve 2a, 2b is correct. The testing control unit therefore determines whether an injection valve 2a, 2b is connected to the respective plug-type connection 3a, 3b and whether the plug-type connections 3a, 3b are connected to the various injection valves 2a, 2b in a correct manner or in an incorrect or reversed manner. Because of the use of the alternating voltage signals of different frequencies, the described testing operation can take place simultaneously for all injection valves 2a, 2b, which saves testing time. As an alternative, the cabling for the individual injection valves 2a, 2b can be tested sequentially by sending a direct-current signal from the testing control unit 9 successively to the different injection valves 2a, 2b.

The control unit 9 includes or is connected with logic for generating the signals supplied to the electric connections 5a, 5b for the injection valves 2a, 2b, logic for reading the output signals from the magnetic field sensors 6a, 6b, logic for comparing the generated signals with the output signals, as well as logic for controlling the output of signals regarding the results of the testing in a user-identifiable form. The control unit 9 may be connected with, or may itself be, a general purpose processor programmed with instructions that cause the processor to perform the described testing steps, specific hardware components that contain hard-wired logic for performing the described testing steps, or any combination of programmed general purpose computer components and custom hardware components.

The testing voltages generated by the testing control unit 9 are preferably selected to be so low that the magnetic field generated by the solenoid coils of the injection valves 2a, 2b which are acted upon by current in this manner is not sufficient for moving the assigned valve adjusting element into its open position so that the injection valves 3a, 2b remain closed during the testing of the cabling. A preservative fluid, which may be contained in the injection valves 2a, 2b, as frequently provided in a new condition, consequently remains in the injection valves 2a, 2b during the testing operation. In this manner, the preservation of the injection valves 2a, 2b can be maintained for subsequent storage or transport of the engine 1.

The described testing operation permits a reliable and easily implemented non-contact testing of the electrical connection of solenoid-coil-operated injection valves 2a, 2b of the internal-combustion engine 1 with a short testing time, in which case particularly also the correct connection of the injection valves 2a, 2b to the control lines 4a, 4b specifically intended for them can be tested.

Figure 2:
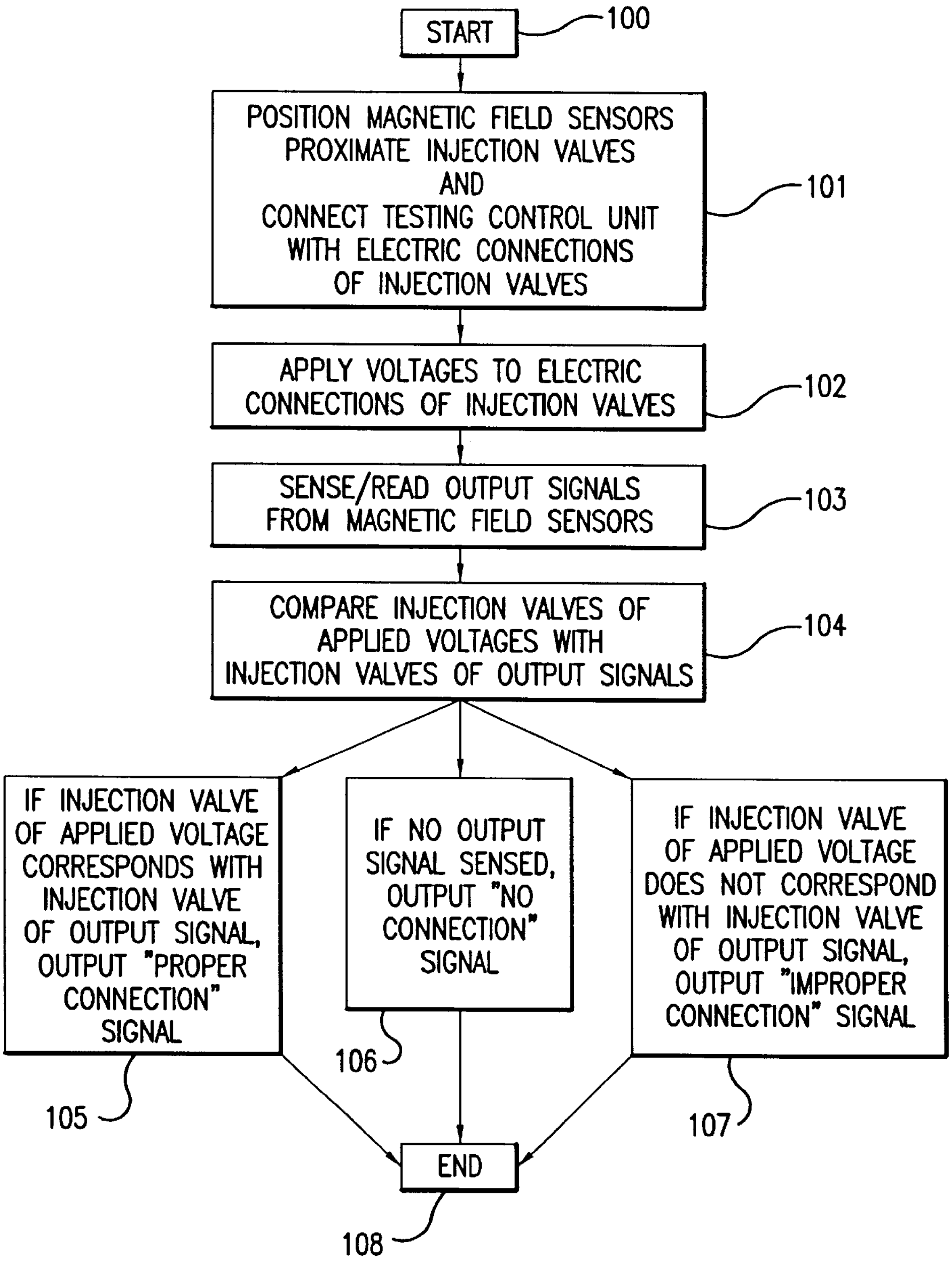
FIG. 2 shows a flow chart of a method for testing the electrical connection of solenoid-coil-operated injection valves of an internal-combustion engine according to a preferred embodiment of the present invention.

The method for testing the electrical connection of solenoid-coil-operated injection valves of an internal-combustion engine according to a preferred embodiment of the present invention is shown in FIG. 2. The method is started in step 100. In step 101 the magnetic field sensors 6a, 6b are positioned proximate the injection valves 2a, 2b, and the testing control unit 9 is connected with the electric connections 5a, 5b for the injections valves 2a, 2b by way of testing connection unit 11. Subsequently, in step 102 voltages are applied to the electric connections 5a, 5b by the testing control unit 9 by way of the testing connection unit 11. Then, in step 103 the magnetic field sensors 6a, 6b sense any magnetic fields generated by the solenoid coils of the injection valves 2a, 2b. The sensed magnetic field output signals are read by the testing control unit 9. In the following step 104, the testing control unit 9 compares the electric connections to which voltages were applied with the output signals read from the magnetic field sensors 6a, 6b.

If the all of the magnetic field output signals correspond to the intended injection valves, i.e., if the injection valves 2a, 2b in which magnetic fields are sensed each correspond to the assigned electric connections 5a, 5b to which voltages were applied, then the electrical connection between the electric connections 5a, 5b and the injection valves 2a, 2b are correct, and a "proper connection" signal is output by the testing control unit in user-identifiable form, for example on a display screen or any other visual or audio communication, in step 105. If no magnetic field output signal is sensed by any of the magnetic field sensors 6a, 6b for one of the voltages applied to an electric connection 5a, 5b, then that electric connection 5a, 5b is not electrically connected to an injection valve, and a corresponding "no connection" signal is output by the testing control unit in user-identifiable form, identifying the electric connections 5a, 5b with no corresponding output signal, in step 106. If the magnetic field output signals do not have a one-to-one correspondence to the intended injection valves, i.e., if the injection valves 2a, 2b in which magnetic fields are sensed do not correspond to the assigned electric connections 5a, 5b to which voltages were applied, then the electrical connection between the electric connections 5a, 5b and the injection valves 2a, 2b is not correct, and an "improper connection" signal is output by the testing control unit in user-identifiable form, identifying the electric connections 5a, 5b which are not correctly connected, in step 107. After testing is completed, the method is ended in step 108.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for testing the electrical connection of a plurality of solenoid-coil-operated injection valves installed in an internal-combustion engine, each of said injection valves being assigned to a respective electric connection of a control connection unit, said method comprising the steps of:

positioning at least one magnetic field sensor proximate the injection valves;

applying a voltage to at least one of the electric connections; and determining whether a magnetic field is detected by said at least one magnetic field sensor.

2. A method according to claim 1, further comprising the step of determining whether a magnetic field detected by said at least one magnetic field sensor is detected at the injection valve assigned to said at least one of the electric connections to which said voltage is applied.

3. A method according to claim 1, wherein in said positioning step a plurality of magnetic field sensors are positioned proximate respective ones of the injection valves and wherein in said applying step a plurality of alternating voltages are simultaneously applied to respective ones of the electric connections, each said alternating voltage having a unique frequency.

4. A method according to claim 3, wherein said determining step further comprises simultaneously determining whether magnetic fields detected by said magnetic field sensors are detected at the injection valves assigned to said respective ones of the electric connections to which said voltages are applied.

5. A method according to claim 1, wherein said at least one magnetic field sensor is contained in a test bench device which is separate from said internal-combustion engine and which is separate from said injection valves.

6. A method according to claim 1, wherein in said positioning step said at least one magnetic field sensor does not contact said injection valves.

7. A method according to claim 1, wherein in said applying step said voltage is less than a voltage required to move a valve adjusting element of said injector element.

8. A method for testing the electrical connection of a plurality of solenoid-coil-operated injection valves installed in an internal-combustion engine, each of said injection valves being assigned to a respective electric connection of a control connection unit, said method comprising the steps of:

positioning a plurality of magnetic field sensors proximate respective ones of the injection valves;

applying a voltage to at least one of the electric connections; and determining whether a magnetic field is detected by said magnetic field sensor at the injection valve assigned to the electric connection to which said voltage is applied.

9. A method according to claim 8, wherein in said applying step a plurality of alternating voltages are simultaneously applied to respective ones of the electric connections, each said alternating voltage having a unique frequency.

10. A method according to claim 9, wherein said determining step further comprises simultaneously determining whether magnetic fields detected by said magnetic field sensors are detected at the injection valves assigned to said respective ones of the electric connections to which said voltages are applied.

11. A method according to claim 8, wherein said at least one magnetic field sensor is contained in a test bench device which is separate from said internal-combustion engine and which is separate from said injection valves.

12. A method according to claim 8, wherein in said positioning step said at least one magnetic field sensor does not contact said injection valves.

13. A method according to claim 8, wherein in said applying step said voltage is less than a voltage required to move a valve adjusting element of said injector element.

14. An apparatus for testing the electrical connection of a plurality of solenoid-coil-operated injection valves installed in an internal-combustion engine, each of said injection valves being assigned to a respective electric connection of a control connection unit, said apparatus comprising:

at least one magnetic field sensor to be positioned proximate respective ones of the injection valves; and a control unit for applying a voltage to at least one of the electric connections and for analyzing output signals of the magnetic field sensors to determine whether a magnetic field is detected by said at least one magnetic field sensor.

15. An apparatus according to claim 14, wherein said control unit further determines whether a magnetic field detected by said at least one magnetic field sensor is detected at the injection valve assigned to said at least one of the electric connections to which said voltage is applied.

16. An apparatus according to claim 14, wherein said at least one magnetic field sensor comprises a plurality of magnetic field sensors positioned proximate respective ones of the injection valves, and wherein said control unit simultaneously applies a plurality of alternating voltages to respective ones of the electric connections, each said alternating voltage having a unique frequency.

17. An apparatus according to claim 16, wherein said control unit simultaneously determines whether magnetic fields detected by said magnetic field sensors are detected at the injection valves assigned to said respective ones of the electric connections to which said voltages are applied.

18. An apparatus according to claim 14, wherein said at least one magnetic field sensor is contained in a test bench device which is separate from said internal-combustion engine and which is separate from said injection valves.

19. An apparatus according to claim 14, wherein said at least one magnetic field sensor is positioned such that it does not contact said injection valves.

20. An apparatus according to claim 14, wherein said voltage is less than a voltage required to move a valve adjusting element of said injector element.

* * * * *